Fig. 3B.
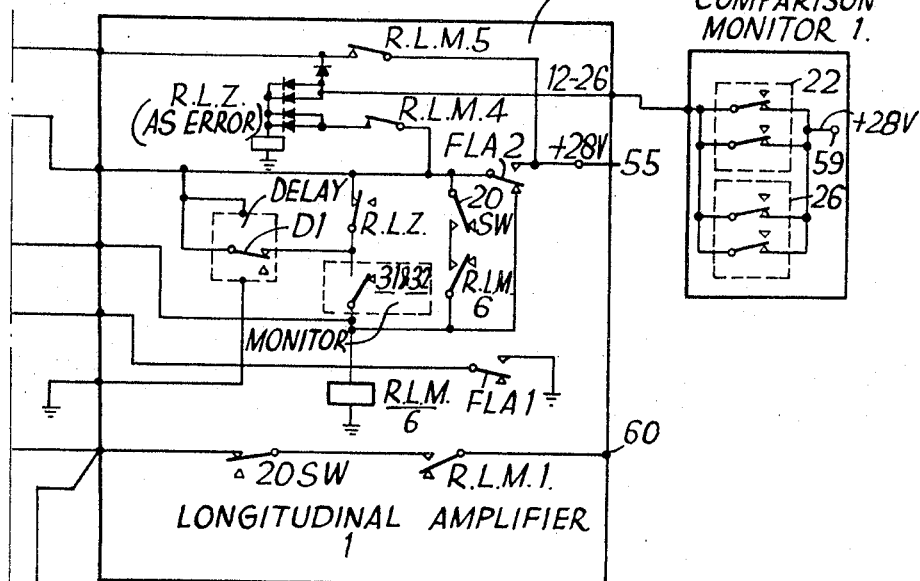
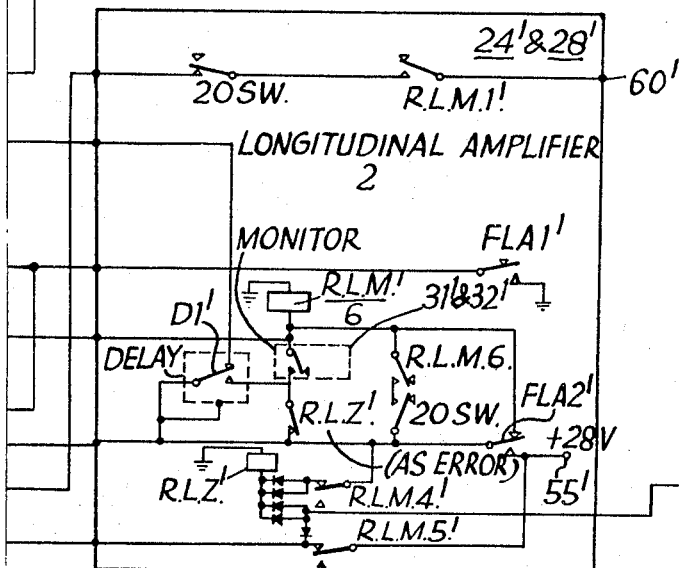

3,425,649
AIRCRAFT AUTOMATIC PILOTS
Arthur John Colwell, Ian Alexander Watson, and John Harper Malcolm Penney, London, England, assignors to Elliott Brothers (London) Limited, London, England
Filed June 9, 1966, Ser. No. 556,458
Claims priority, application Great Britain, June 12, 1965, 24,924/65
U.S. Cl. 244—77
Int. Cl. B64c *13/18*
12 Claims

ABSTRACT OF THE DISCLOSURE

An aircraft automatic pilot having two separate automatic throttle control arrangements each capable of controlling the throttle, both operating continuously to give an output but only one of which is connected to control the throttle at any one time. Throttle control is switched from one control arrangement to the other by monitoring means responsive to faults in said one control arrangement.

---

The invention relates to aircraft automatic pilots.

According to one aspect of the invention an aircraft automatic pilot apparatus includes at least two separate automatic throttle control arrangements each capable of controlling the throttle of the aircraft in flight, the arrangement being such that, in use, one of the automatic throttle control arrangements is operating and controls the throttle of the aircraft and the other automatic throttle control arrangement is operating but is not connected to control the throttle of the aircraft, monitoring means being provided capable of monitoring the operation of said one automatic throttle control arrangement and capable of causing said other automatic throttle control arrangement to take over control of the throttle of the aircraft upon the detection of a fault in said one automatic throttle control arrangement.

Preferably the monitoring means operates to compare a signal representative of the true air-speed with a signal representative of the desired air-speed and to effect the take-over if the difference between these signals exceeds a predetermined limit.

Each automatic throttle arrangement may include a servo-motor engageable to drive the throttle levers of the aircraft and driven in response to air-speed error signals and position signals from a vertical gyroscope. The servo-motor may drive a tachometer which provides an output which is fed back to provide part of the driving input to the servo-motor.

Preferably second monitoring means are provided for monitoring the servo-motor, the second monitoring means comprising means for comparing the output from the tachometer on the one hand with the air-speed error signals and the position signals from the vertical gyroscope on the other hand to give an output whereby changeover of control of the aircraft to the other automatic throttle control arrangement is effected if the comparison detects a fault. The second monitoring means may comprise a servo simulator for simulating the servo-motor, the simulator being provided with the air-speed error signals and the position signals from the vertical gyroscope as inputs and giving as output a simulated signal corresponding to the tachometer feed-back signal, and means for comparing the simulated tachometer feed-back signal with the actual tachometer feed-back signal and giving an output when the difference therebetween exceeds a predetermined limit.

Preferably third monitoring means are provided for monitoring the vertical gyroscope, the third monitoring means comprising a circuit for modifying the position signals and a comparator for comparing the modified position signals with the actual tachometer feed-back signal, the comparator giving an output whereby changeover of control of the aircraft to the other automatic throttle control arrangement is effected if the comparison detects a fault. The modified position signals are preferably passed before comparison through a threshold device effective to discriminate between signals within and witthout a given amplitude range.

The automatic throttle control arrangements may be assocciataed with manually operable selection means capable of selecting either of the automatic throttle control arrangements to control the throttle of the aircraft, automatic selection means also being associated with the automatic throttle control arrangements, which automatic selection means being arranged to override the manually operable selection means to select said one automatic throttle control arrangement at a predetermined time during the flight of the aircraft, e.g. at the start of flaring the aircraft preparatory to landing.

The foregoing and further features of the invention will become apparent from the following description of a preferred embodiment thereof with reference to the accompanying drawings, in which.

Figure 1:
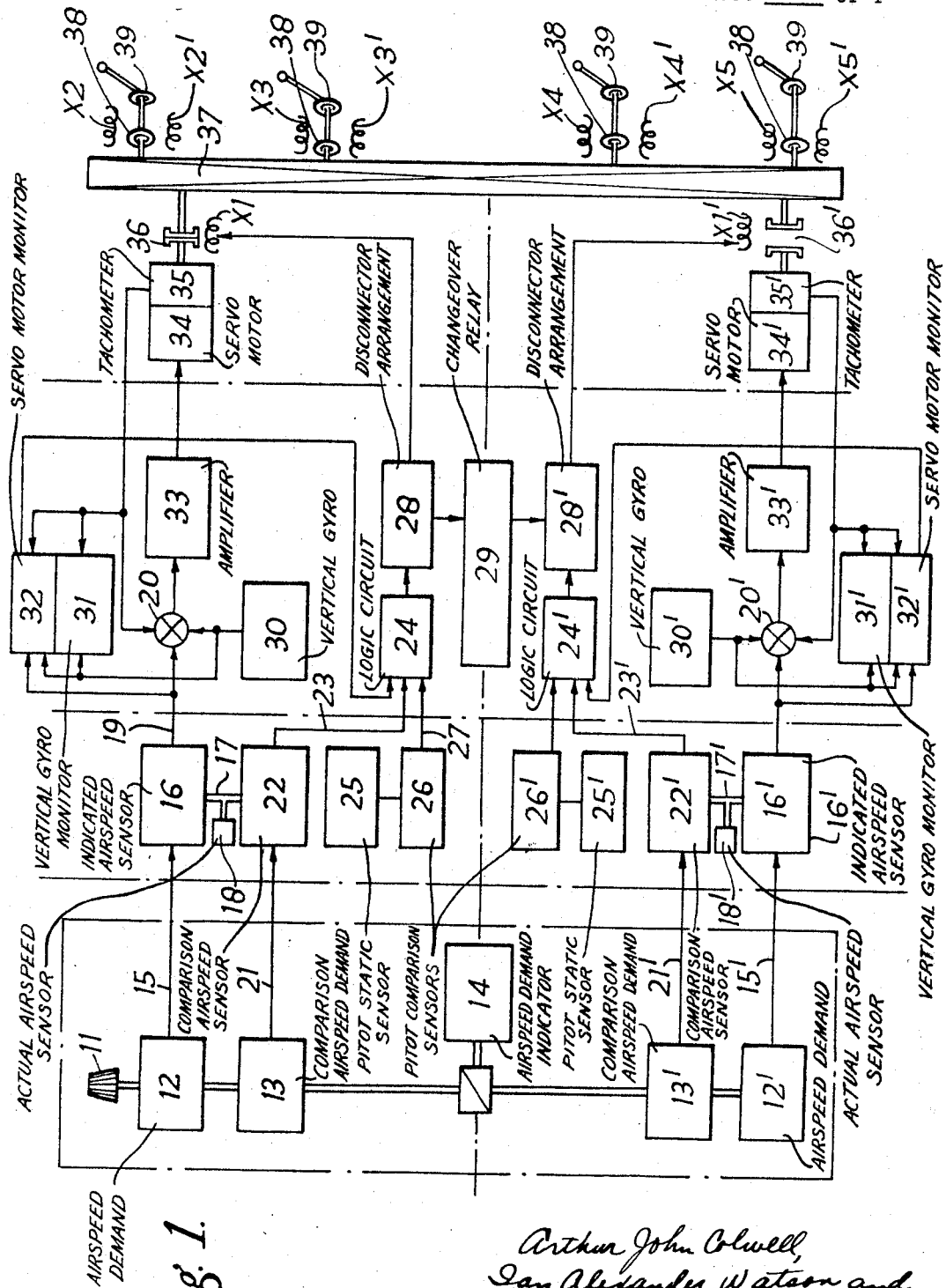
FIGURE 1 shows a block schematic representation of a duplicaate monitored aircraft automatic throttle control system.

Referring firstly to FIGURE 1 there is shown a block schematic representation of a duplicate monitored aircraft automatic throttle control system. A manually operable control knob 11, for setting a required indicated air-speed into the system is mechanically linked to an indicated air-speed demand arrangement 12, a comparison indicated air-speed demand arrangement 13 and means 14 for indicating the indicated air-speed which is demanded.

The indicated air-speed and demand arrangement 12 provides at its output on lead 15 an electrical signal representative of the required indicated air-speed mechanically set into the arrangement 12, which output is fed via the lead 15 to an indicated air-speed air data sensor 16. A signal representative of actual indicated air-speed is fed via mechanical linkage 17 from means 18 to the indicated air-speed air data sensor 16. The indicated air-speed air data sensor 16 produces an electrical output signal on lead 19 representative of air-speed error, which signal is fed via the lead 19 to a summing point 20. In the same way the comparison indicated air-speed demand arrangement 13 produces an electrical output signal on lead 21 representative of the required indicated air-speed, which signal is fed via the lead 21 to a comparison indicated air-speed air data sensor 22. The comparison indicated air-speed air data sensor 22 is also fed with the signals representative of actual air-speed via the mechanical linkage 17 from means 18 and produces an output on lead 23, representative of air-speed error, which is fed to a logic arrangement 24.

A pitot static air data sensor 25 is connected to feed a signal to a pitot static comparison air data sensor 26 which produces an output on the lead 27 representative of error in speed of the aircraft, which signal is fed via the lead 27 to the logic arrangement 24. The logic arrangement 24 is connected via a disconnect arrangement 28 to an automatic change-over relay 29.

A vertical gyro 30 is connected to provide an output which is fed to the summing point 20, a vertical gyro hardover monitor 31 and a servomotor monitor 32, the servo-motor monitor 32 also deriving an input from the indicated air-speed air data sensor 16 from lead 19.

The output from the summing point 20 is connected via an amplifier 33 to control a servo-motor 34 having a tachometer 35 connected thereto. The output from the tachometer 35 is utilised as a feedback signal to provide a further input to the summing point 20 and is also connected to provide inputs to the vertical gyro hardover monitor 31 and the servo-motor monitor 32. An output from the vertical gyro hardover monitor 31 and the servo-motor monitor 32 is connected to provide a further input to the logic arrangement 24.

The output from the servo-motor 34 is connected to an electromagnetic clutch 36 whose operation is controlled via an energising coil X1 from the disconnect arrangement 28. The other side of the electro-magnetic clutch 36 is connected via an automatic throttle actuator arrangement 37 and through four slipping clutches 38 to four throttle levers 39 which control the throttling of the aircraft engines. Each of the four slipping clutches 38 have associated therewith an actuating coil X2, X3, X4 and X5 respectively. A second duplicate automatic throttle control arrangement identical to the one hereinbefore described is also shown in the drawing, the component parts thereof being given the same reference numerals as for the corresponding component parts in the first arrangement but the reference numerals for the second arrangement being primed.

In operation the aircraft pilot manually sets via the knob 11 the required indicated air-speed and an electrical signal representative of this required indicated air-speed is fed from the indicated air-speed demand arrangement 12 via the lead 15 to the indicated air-speed air data sensor 16. The indicated air-speed air data sensor 16 compares this signal with the actual indicated air-speed signal from mechanical connections 17 and provides an electrical output signal representative of air-speed error which is fed via the lead 19 to the summing point 20. This air-speed error signal together with the signal from the vertical gyro 30 is fed via amplifier 33 to control the operation of servo-motor 34. The tachometer 35 produces an output signal which is fed back to the summing point 20 and hence the servo-motor 34 is moved to the required position so positioning the throttle levers 39 via the clutch 36 and the clutches 38.

The inputs to logic arrangement 24 from the indicated air-speed comparison air data sensor 22 and the pitot static comparison air data sensor 26 each representative of speed errors, are fed to threshold circuits in the logic arrangement 24. If the signals on the leads 23 and 27 exceed the threshold of the threshold circuit a signal is passed to the disconnect arrangement 28 which causes the clutch 36 to be de-energised and causes the automatic change-over relay 29 to release which in turn causes the disconnect arrangement 28' to control energisation of coil X1' of clutch 36' so causing the second automatic throttle control arrangement to take over control of the throttles.

Similiarly any fault in the vertical gyro 30 will be determined by a comparison of signals from the vertical gyro 30 and from the tachometer 35 in the vertical gyro hardover monitor 31. Any fault in the servomotor 34 is detected by a comparison of on the one hand, a signal from the tachometer 35 and, on the other hand, signals from the indicated air-speed air data sensor 16 and from the vertical gyro 30 in the servo-motor monitor 32. The construction and operation of the vertical gyro hardover monitor 31 and the servo-motor monitor 32 is hereinafter more fully described with reference to FIGURE 2. Any faults determined by the monitors 31 or 32 provide a signal to the logic element 24 to cause disengagement of the clutch 36 and engagement of the clutch 36' as previously described.

The operation of the second automatic throttle control arrangement for controlling the position of the throttle levers 39 is identical to the operation of the first automatic throttle control arrangement except that if the clutch 36' is caused to be disengaged due to a fault anywhere in the system there is no automatic change-over to a further system and instead a warning indication is given to the pilot as will be more fully described with reference to FIGURE 3.

Figure 2:
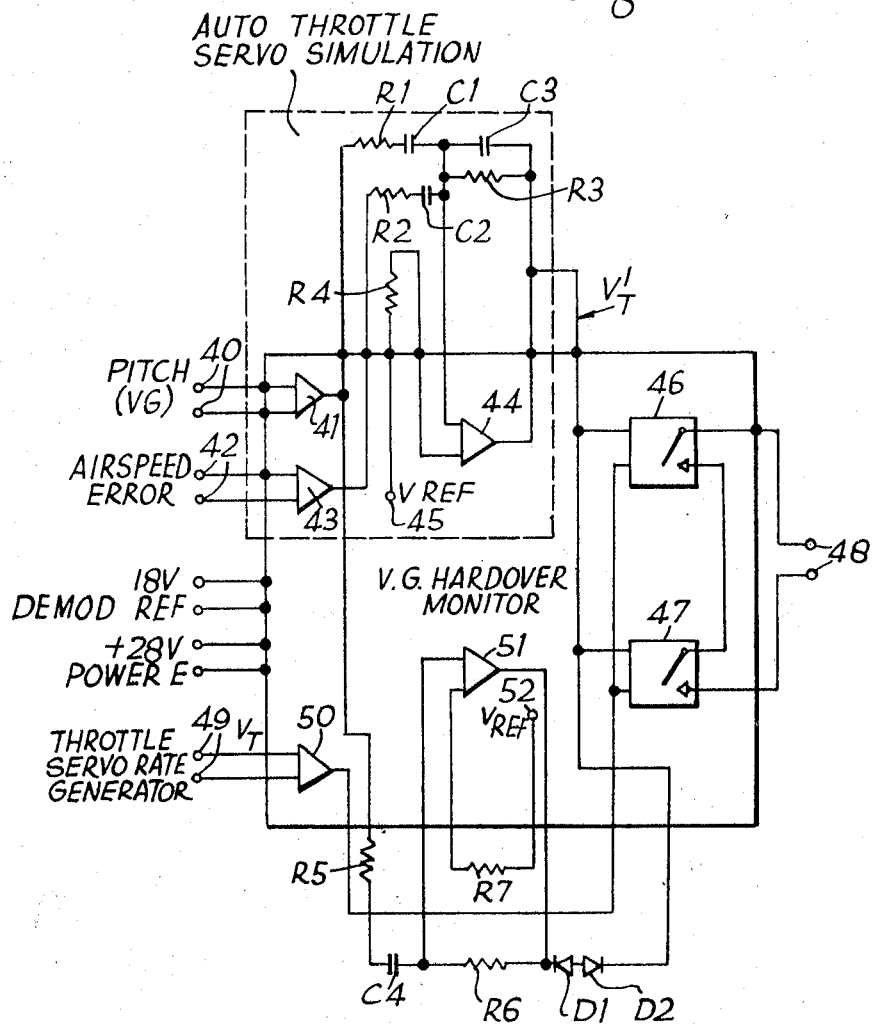
FIGURE 2 shows a block schematic representation of a monitoring element of the system of FIGURE 1 in greater detail.

Referring now to FIGURE 2 there is shown in greater detail a block schematic representation which can be utilised as a joint vertical gyroscope hardover monitor 31 (31') and servo-motor monitor 32 (32') in the arrangement of FIGURE 1.

Pitch signals from the vertical gyroscope 30 are fed via terminals 40 to a demodulator 41. Air-speed error signals from the indicated air-speed air data sensor 16 are arranged to be fed via terminals 42 to a demodulator 43. The outputs from the demodulators 41 and 43 are each connected to a separate resistor/capacitor series combination R1, C1 and R2, C2 respectively. The plates of the capacitors C1 and C2 remote from the resistors R1 and R2 respectively are commonly connected to one side of a resistor/capacitor parallel combination R3, C3. The two extremities of the resistor/capacitor parallel combination R3, C3 are connected across the input and output of an amplifier 44 which derives a further input via a resistor R4 from a voltage reference terminal 45.

The portion of the arrangement thus far described provides, in operation, a simulation of the servo-motor servo loop and hence the output from amplifier 44 is representative of a comparison signal for the feed back signal from the tachometer 35.

The output from the D.C. amplifier 44 is connected to provide one input for each of two comparators 46 and 47, the outputs of which comparators are connected in series. In operation the contacts shown in the comparators are normally closed and if a fault is detected by either comparator or if one comparator itself becomes faulty the connection between the two terminals 48 is broken, this being utilised to cause disconnection of the associated clutch.

The input from the tachometer 35 is fed via terminals 49 to a demodulator 50, the output of which is connected to provide the other inputs for the comparators 46 and 47.

The arrangement thus far described provides the servo-motor monitor 32 and it will be seen that if there is a fault in the servo-motor a disparity between the input signals to the comparator will be determined and the connection between the terminals 48 broken.

However if there is a fault in the vertical gyroscope such a fault would affect both the inputs to the comparators 46 and 47 and the fault would not be detected. Hence the pitch signals fed via terminals 40 to the demodulator 41 are also fed from the output of demodulator 41 to a resistor/capacitor series combination R5, C4. The plate of the capacitor C4 remote from the resistor R5 is connected to a resistor R6 which is in turn connected across the input and output of a D.C. amplifier 51 which derives a further input via a resistor R7 from a voltage reference terminal 52. The side of resistor R6 remote from the capacitor C4 is connected via two diodes D1 and D2 connected back to back, to the first inputs of the comparators 46 and 47. This latter described arrangement provides a threshold circuit so that if a hardover fault should occur in the vertical gyroscope a surge signal is fed to the first inputs of comparators 46 and 47 and the associated clutch 36 (36') is rapidly disengaged.

Figure 3A:
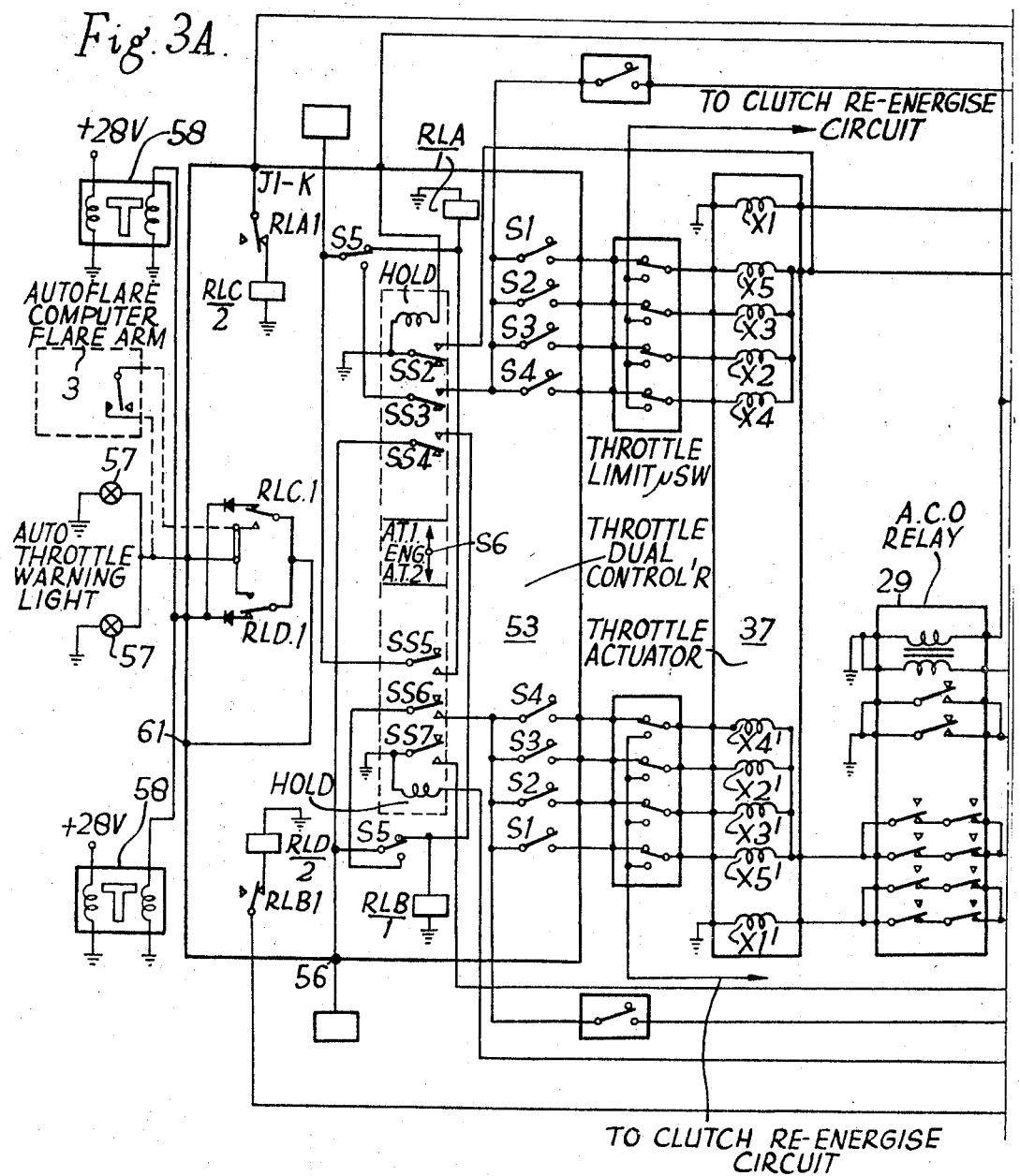
FIGURE 3 shows a circuit diagram of a part of the system of FIGURE 1.

Referring now to FIGURE 3 there is shown a circuit diagram which illustrates a portion of the arrangement of FIGURE 1 in greater detail and from which the operation of the logic arrangements 24 and 24', the disconnect arrangements 28 and 28' and the automatic changeover relay 29 is apparent. In this figure 11 relay contacts are shown in their de-energised positions.

Before describing the monitoring and auto-changeover arrangement there will be described an arrangement which is manually operable for selecting one or other of the two automatic throttle control arrangements. To achieve this there is provided a throttle dual controller 53 which is manually operable to either one of two positions. The throttle dual controller includes switches S1, S2, S3, S4 and S5 which are operated irrespective of which of the two directions the throttle dual controller is moved to. A further switch S6 comprising six sub-switches SS2–SS7 is arranged such that when the first automatic throttle control arrangement is to be actuated the sub-switches SS2, SS3 and SS4 alone are actuated and when the second automatic throttle control arrangement is to be brought into operation the remaining sub-switches SS5, SS6 and SS7 are actuated.

With the throttle dual controller 53 actuated so as to engage the first automatic throttle control arrangement switches S1, S2, S3 and S5 are closed to complete a circuit for the energisation of clutch coils X2, X3, X4 and X5 from earth through sub-switch SS2 closed, clutch coils X2–X5, switches S1–S4, sub-switch SS3 closed, switch S5 closed to a voltage source at terminal 54. Switch S5 opening breaks the circuit from earth through a relay RLA/1 to terminal 54. Relay contact RLA1 returning to its de-energised position primes a circuit for the energisation of relay RLC/2 which is prevented from operating by a relay contact RLM5 energised, its relay RLM/6 being energised via the circuit through earth, operating coil of relay RLM/6, contact FLA2 deenergised, contact 180KTSW energised, sub-switch SS3 operated, switch S5 operated to terminal 54. Sub-switch SS4 in closing completes a circuit to maintain the energisation of a relay RLB/1, which would have released due to the change-over of switch S5, through a circuit earth, operating coil of RLB/1, sub-switch SS4 closed, to a voltage terminal 56. A contact RLB1 in its de-energised position ensures that a relay RLD/2 remains de-energised. The two relays RLC/2 and RLD/2 remaining de-energised ensure via their contacts RLC1 and RLD1 that auto-throttle warning lights 57 are not illuminated and that two indicators 58 provide a display to indicate that one of the auto-throttle control arrangements is in operation.

In this manually selected mode of operation the automatic throttle control arrangement is monitored by the monitors 22 and 26 alone and it will be seen that any fault detected in these monitors will allow their contacts to release so closing the circuit for energisation of relay RLC/2 from earth connected to the operating coil of relay RLC/2 to the voltage supply terminal 59. Hence any fault detected will cause the auto-throttle warning lights 57 to be illuminated via operated contact RLC1.

The operation of the second automatic throttle control arrangement when manually selected is similar to that described for the first automatic throttle control arrangement described above and therefore will not further be described herein.

When it is required to bring in the automatic change-over arrangement, for example as shown in FIGURE 3 at the time of commencing to flare the aircraft preparatory to landing the first automatic throttle control arrangement is automatically selected regardless of which automatic throttle control arrangement is in operation as selected by the throttle dual controller 53.

Initially flare arm contacts FLA1 and FLA2 are energised by their relay which is contained in an associated automatic pilot arrangement (not shown). Contact FLA1 connects earth to the throttle clutches X2, X3, X4 and X5 of the first automatic throttle control arrangement regardless of the position of sub-switch SS2 in the throttle dual controller 53 and contact FLA2 connects the source of voltage at terminal 55 to the switches S1–S4 regardless of the position of sub-switch SS3 in the throttle dual controller 53. The closing of contact FLA2 also breaks the previous operating circuit for relay RLM/6 and switches this circuit through on the one hand a contact of a relay RLZ, which is energised when an error is detected in monitors 22 or 26, in series with the contact of monitors 31 and 32 and, on the other hand, a parallel circuit comprising a switch contact 20 SW in series with a contact RLM6. Initially these two alternative circuits are by-passed by a delay contact D1 which opens three or four seconds after engagement. The purpose of this delay is to prevent an immediate nuisance disconnect if engagement is made outside air-speed error limits, and also to allow the monitor interlock circuits time to assume their correct positions. Assuming no sustained air-speed errors, relay RLZ will be de-energised. If the throttle servo is operating correctly the contacts of monitors 31 and 32 will be energised.

Hence a voltage source, from terminal 55, is supplied to the operating coil of relay RLM/6 and to the throttle motor clutch X1 in the throttle actuator 37, and the first automatic throttle control arrangement is energised and clutched onto the throttle levers 39 (FIGURE 1). Contact RLM4 is energised and prevents the positive voltage source at terminal 55 from being permanently connected to the operating coil of relay RLZ. Contact RLM1 is energised and connects a voltage source from a terminal 60 via a de-energised switch 20SW to the operating coil of the automatic change-over relay 29 and hence this relay is energised.

This sequence of events is identical for the second automatic throttle control arrangement but as soon as the automatic change-over relay 29 is engaged the throttle clutches X2'–X5' are disconnected from earth. The motor clutch X1' is disconnected from its voltage supply at terminal 55' and the earth connection to the interlock by-pass delay D1' is broken. Hence relay RLM'/6 is energised but all the clutches associated with the second automatic throttle control arrangement are disengaged.

The monitoring system has been fully described with reference to FIGURE 1 and will only be further described with regard to their relevance to FIGURE 3. Errors detected by monitors 22 or 26 cause the relay contacts therein to be de-energised. Thus a voltage source at terminal 59 is applied to the operating coil of relay RLZ which becomes energised and breaks the circuit for relay RLM/6 from the voltage source at terminal 55 through its contact RLZ opening. Relay contact RLZ opening also breaks the voltage supply from terminal 55 to the motor clutch coil X1 and hence the first automatic throttle control arrangement is disconnected. Contact RLM4 releasing connects the voltage source from terminal 55 permanently to the operating coil of relay RLZ holding it energised and preventing relay RLM/6 and motor clutch energising coil X1 from re-engaging should the errors be corrected by the second automatic throttle control arrangement. Contact RLM5 closing causes the voltage supply from terminal 55 to be connected to the warning circuit (relay RLC/2) as previously described. Relay contact RLM1 opening causes the automatic change-over relay 29 to be de-energised and hence all the automatic change-over relay contacts close.

The monitor interlock circuits in the second automatic throttle control arrangement are by-passed by the delay switch D1' and hence a voltage supply from terminal 55' is connected to the motor clutch energising coil X1' in the throttle actuator 37, and hence the second automatic throttle control arrangement is engaged and should correct the air-speed error.

Four seconds after the automatic change-over relay 29 has broken the earth connection to the delay switch, to actuate it, the contact D1' opens. By this time the second automatic throttle control arrangement should have corrected the air-speed error and relay RLZ will be de-energised. If the servo control arrangement of the second automatic throttle control arrangement is working correctly the contacts in the monitor 31' and 32' are closed and hence the voltage source at terminal 55' is connected to relay RLM'/6 and motor clutch energising coil X1'; consequently the second automatic throttle control arrangement is in control of the throttle levers 39 (FIGURE 1).

Any further fault will cause the second automatic throttle control arrangement to disconnect and lock out exactly as described for the first automatic throttle control arrangement. Also the same sequences of events will occur if the monitors 31 and 32 or 31' and 32' detect a failure of the servo-motor or the vertical gyro and cause the contact in these monitors to open.

The system also provides that when the aircraft reaches a height of twenty feet automatic closure of the throttles takes place, this being achieved by the 20SW and 20SW' switches. At this time if monitoring were left in, a disconnect would occur and the first automatic throttle control arrangement would also disconnect. This would leave both arrangements disconnected and no throttle closure would occur. To prevent this happening a 20SW switch contact closes, by-passing the monitoring contacts. As can be seen from FIGURE 3 this contact is in series with relay contact RLM6 so that engagement of the arrangement is prevented if it has already disengaged due to a fault. The other 20SW switch is connected in series with the automatic change-over relay 29 engage line and opening of this contact automatically engages the second automatic throttle control arrangement. Hence when the aircraft reaches a height of twenty feet both throttle systems are monitored, but are connected in parallel and both operate to close the throttle, unless the first automatic throttle control arrangement has disconnected previously.

With regard to the warning indication, prior to flaring with manual selection of the automatic control arrangements, warning of air-speed error is given by illumination of the warning lights 57 as previously described. The warning lights 57 are illuminated if either throttle system is faulty. The T of the indicators 58 become cross-hatched if both automatic throttle control arrangements have failed due to the disconnection of a voltage supply to their operating coils from a terminal 61 via relay contacts RLC1 and RLD1 both operated. Hence if the first automatic throttle control arrangement fails and a change-over occurs, leaving the second automatic throttle control arrangement in control, the warning is the two warning lights 57 illuminated and a white T flag is provided on each indicator 58. Subsequent failure of the second automatic throttle control arrangement provides a warning of the two lights 57 being illuminated and a cross-hatched T flag on each indicator 58.

The arrangement hereinbefore described is particularly suitable for use with an automatic pilot system capable of providing automatic control of flaring an aircraft. The arrangement shown in the embodiment is capable of achieving close air-speed control during auto-flare with a high degree of reliability. The automatic changeover arrangement provides for extremely rapid change of control from one automatic control arrangement to the other so being capable of producing the high accuracy of air-speed holding required (plus or minus 4 knots down to twenty feet) if a fault occurs during auto-flare. The fault survival system disclosed also reduces the pilot's throttle work load to a monitoring function, as is the case with an auto-pilot control arrangement.

What we claim is:

1. An aircraft automatic pilot apparatus including at least two separate automatic throttle control arrangements each capable of controlling the throttle of the aircraft in flight, the arrangement being such that, in use, one of the automatic throttle control arrangements is operating and controls the throttle of the aircraft and the other automatic throttle control arrangement is operating but is not connected to control the throttle of the aircraft, monitoring means being provided capable of monitoring the operation of said one automatic throttle control arangement and capable of causing said other automatic throttle control arrangement to take over control of the throttle of the aircraft upon the detection of a fault in said one automatic throttle control arrangement.

2. An apparatus as claimed in claim 1, wherein the monitoring means operates to compare a signal representative of the true air-speed with a signal representative of the desired air-speed and to effect the takeover of control if the difference between these signals exceeds a predetermined limit.

3. An apparatus as claimed in claim 1, wherein each automatic throttle arrangement includes a servo-motor engageable to drive the throttle levers of the aircraft and driven in response to air-speed error signals and position signals from a vertical gyroscope.

4. An apparatus as claimed in claim 3, wherein a tachometer is driven by the servo-motor and provides an output which is fed back to provide part of the driving input to the servo-motor.

5. An apparatus as claimed in claim 4, wherein second monitoring means are provided for monitoring the servo-motor, the second monitoring means comprising means for comparing the output from the tachometer on the one hand with the air-speed error signals and the position signals from the vertical gyroscope on the other hand to give an output whereby change-over of control of the aircraft to the other automatic throttle control arrangement is effected if the comparison detects a fault.

6. An apparatus as claimed in claim 5, wherein the second monitoring means comprise a servo simulator for simulating the servo-motor, the simulator being provided with the air-speed error signals and the position signals from the vertical gyroscope as inputs and giving as output a simulated signal corresponding to the tachometer feed-back signal, and means for comparing the simulated tachometer feed-back signal with the actual tachometer feed-back signal and giving an output when the difference therebetween exceeds a predetermined limit.

7. An apparatus as claimed in claim 5, wherein third monitoring means are provided for monitoring the vertical gyroscope, the third monitoring means comprising a circuit for modifying the position signals and a comparator for comparing the modified position signals with the actual tachometer feed-back signal, the comparator giving an output whereby change-over of control of the aircraft to the other automatic throttle control arrangement is effected if the comparison detects a fault.

8. An apparatus as claimed in claim 7, wherein the modified position signals are passed before comparison through a threshold device effective to discriminate between signals within and without a given amplitude range.

9. An apparatus as claimed in claim 1, wherein the automatic throttle control arrangements are associated with manually operable selection means capable of selecting either of the automatic throttle control arrangements to control the throttle of the aircraft, automatic selection means also being associated with the automatic throttle control arrangements, which automatic selection means being arranged to override the manually operable selection means to select said one automatic throttle control arrangement at a predetermined time during the flight of the aircraft.

10. An aircraft automatic pilot apparatus including at least two separate automatic throttle control arrangements each including a servo motor adapted to drive the throttle levers of the aircraft, a tachometer coupled to the output of each servo motor and providing feedback signals, summation means for summing throttle control signals and said feedback signals, means coupled to said summation means and said servo-motor for applying the summed signals to drive the servo-motor, monitoring means coupled to said servo-motor and said automatic throttle control arrangements for monitoring the operation of one automatic throttle control arrangement and causing the other automatic throttle control arrangement to take over control of the throttle levers of the aircraft upon detection of a fault in said one automatic throttle control arrangement, the monitoring means including a servo-motor simulator connected to receive said throttle control signals and effective to provide output signals which, in the absence of a fault, are the same as said feedback signals, and comparator means for comparing the feedback signals with the simulator output signals and to give an output in response to a difference therebetween, whereby when said one of the automatic throttle control arrangements is operating and controls the throttle of the aircraft, the other automatic throttle control arrangement is operating but is not connected to control the throttle of the aircraft, and detection of a fault by the monitoring means monitoring the one throttle control arrangement causes the other throttle control arrangement to take over control of the throttle levers of the aircraft.

11. An apparatus as claimed in claim 10 further including a vertical gyroscope for supplying position signals, which position signals, together with air-speed error signals, comprise said throttle control signals.

12. An apparatus as claimed in claim 11 wherein the monitoring means includes a monitor for monitoring the vertical gyroscope, said gyroscope monitor comprising a circuit for modifying the position signals and a comparator for comparing the modified position signals with the actual tachometer feedback signal, the comparator giving an output whereby changeover of control of the aircraft to the other automatic throttle control arrangement is effected if the comparison detects a fault.

References Cited

UNITED STATES PATENTS 3,190,586   6/1965   Righton _____ 244—77

FERGUS. S. MIDDLETON, *Primary Examiner.*

U.S. Cl. X.R.
318—489; 91—363